(12) United States Patent
Olbrich

(10) Patent No.: US 6,502,178 B1
(45) Date of Patent: Dec. 31, 2002

(54) METHOD, SYSTEM, AND PROGRAM FOR MAPPING LOGICAL ADDRESSES TO HIGH PERFORMANCE ZONES ON A STORAGE MEDIUM

(75) Inventor: Aaron Keith Olbrich, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/503,279

(22) Filed: Feb. 14, 2000

(51) Int. Cl.$^7$ .............................................. G06F 12/00
(52) U.S. Cl. ........................... 711/202; 711/112; 711/4; 711/150
(58) Field of Search ........................... 360/106, 71, 75; 369/30, 24.01, 34.01; 713/2; 386/125; 711/112, 113, 114, 202, 4, 150

(56) References Cited

U.S. PATENT DOCUMENTS

| | | | |
|---|---|---|---|
| 4,331,990 A | 5/1982 | Frandsen | 360/106 |
| 4,423,448 A | 12/1983 | Frandsen | 360/106 |
| 4,577,240 A | 3/1986 | Hedberg et al. | 360/22 |
| 5,223,993 A | 6/1993 | Squires et al. | 360/77.08 |
| 5,293,282 A | 3/1994 | Squires et al. | 360/77.08 |
| 5,341,351 A * | 8/1994 | Ng | 369/30 |
| 5,343,347 A | 8/1994 | Gilovich | 360/106 |
| 5,355,486 A | 10/1994 | Cornaby | 709/102 |
| 5,701,477 A | 12/1997 | Chejlava, Jr. | 713/2 |
| 6,076,143 A * | 6/2000 | Blumenau | 711/114 |
| 6,141,493 A * | 10/2000 | Chen et al. | 386/125 |

FOREIGN PATENT DOCUMENTS

JP 3263659 11/1991

* cited by examiner

Primary Examiner—Than Nguyen
(74) Attorney, Agent, or Firm—David W. Victor; Konrad Raynes Victor & Mann, LLP

(57) ABSTRACT

Disclosed is a system, method, and program for mapping logical addresses to physical sectors on a storage device including at least one storage medium surface. A determination is made of logical addresses that are specified to be stored in a high throughput region on one storage medium surface. At least two read/write heads operate on the storage medium surface including the high throughput region to increase performance of access operations in the high throughput region. A mapping is generated of the determined logical addresses to the high throughput region. The logical addresses mapped to the high throughput region are capable of being non-contiguous.

25 Claims, 3 Drawing Sheets

METHOD, SYSTEM, AND PROGRAM FOR MAPPING LOGICAL ADDRESSES TO HIGH PERFORMANCE ZONES ON A STORAGE MEDIUM

BACKGROUND OF THE INVENTION

1. Field of the Invention

The present invention relates to a method, system, and program for mapping logical addresses to high performance sectors on a storage medium and, in particular, high performance sectors capable of being accessed by multiple read/write heads.

2. Description of the Related Art

A hard disk drive receives input/output (I/O) requests, i.e., read/write request, with respect to locations on the disk drive. A hard disk drives includes a servo controlled actuator that moves a slider across the disk surface. A head is positioned at the end of the slider opposite the actuator to read and write data to the disk surface medium. FIG. 1 illustrates the arrangement of a recording surface of a disk drive 2 divided into concentric circular "tracks" on the disk surface. If there are multiple disks, then the vertical alignment of the tracks, on the disks aligned in parallel, together comprise a cylinder.

The outer cylinder is shown as reference 4. Each cylinder is further divided into user data regions 6a–h and prerecorded servo sectors 8a–h. A logical block address ("LBA") is used to address a specific location within the disk stack and is mapped by the disk drive control electronics to a cylinder or track, head number indicating a particular head in a multi-disk system, and sector. Thus, the head indicates a disk and surface in a multi-drive and/or multi storage surface system. Sectors on the disk may comprise 512 bytes, which is the same size as a typical LBA. In this way, a location on the disk can be expressed according to Cylinder/Head/Sector (CHS). Each user data region 6a–h may include one or more sectors. Further, a sector may be split across data regions 6a–h.

The I/O commands may be received at a rate faster than they can be executed against the disk drive storage medium by the storage controller. In such case, the I/O commands are queued for execution by the controller one-at-a-time. The positioning time or total access time to process an I/O request includes: seek time, which is the time to move the actuator and head from one track to another, and latency time, which is the time the head has to wait for disk rotation until the target sector on the track is positioned under the head. These delay times multiply as the number of I/O requests directed toward a disk drive increases. Over the years increases in the storage capacity of disk drives has led to increases in the number of users and application processes accessing a single disk drive, thereby substantially increasing the number of I/O requests directed toward a specific drive.

To reduce the processing time of I/O requests, disk drive manufacturers have developed disk drives that place two separately movable heads on a single disk drive surface. One such disk drive, known as the Chinook disk drive made by Conner Peripherals, Inc., placed two actuator arms, each having a head, on each disk surface. The Chinook defines a disk drive system of five disk platters, where each platter has two disk drive heads per surface, hence twenty disk drive heads total. The Chinook multiple actuator disk drive including two heads per surface is described in U.S. Pat. No. 5,223,993, entitled "Multiple Actuator Disk Drive" and assigned to Conner Peripherals, Inc., which patent is incorporated herein by reference in its entirety. The Chinook places two separately movable actuators 180 degrees opposite each other on a disk surface such that both actuators are capable of accessing any position on the disk surface based upon which actuator can access the location in the shortest time. This arrangement effectively reduces the surface area assigned to each head and reduces the seek and latency times as any one of the heads is more likely to be closer to a random position on the disk than a single head. Thus, using two heads increases the speed of processing I/O requests because overall access times are reduced and two heads are available to handle two I/O requests concurrently.

One problem with the prior art disk drives employing multiple heads on each surface is the cost of the multiple heads. Cost issues in fact have significantly dampened demand for the Chinook and other similar disk drive systems including multiple heads on each disk surface.

Thus, there is a need in the art for providing a system that improves I/O request throughput to a disk drive and at the same time does not exceed consumer cost expectations.

SUMMARY OF THE PREFERRED EMBODIMENTS

To overcome the limitations in the prior art described above, preferred embodiments disclose a system, method, and program for mapping logical addresses to physical sectors on a storage device including at least one storage medium surface. A determination is made of logical addresses that are specified to be stored in a high throughput region on one storage medium surface. At least two read/write heads operate on the storage medium surface including the high throughput region to increase performance of access operations in the high throughput region. A mapping is generated of the determined logical addresses to the high throughput region. The logical addresses mapped to the high throughput region are capable of being non-contiguous.

In further embodiments, generating the mapping comprises associating a range of contiguous sectors in the high throughput region with at least two ranges of noncontiguous logical addresses. The ranges of non-contiguous logical addresses map to the contiguous sectors in the high throughput region.

In still further embodiments, the multiple read/write heads operating on the storage medium surface including the high throughput region are both capable of accessing every sector in the high throughput region.

Yet further, the logical addresses that are specified to be stored in the high throughput region comprise logical addresses used for a file system of a host operating system. Alternatively, the logical addresses that are specified to be stored in the high throughput region comprise logical addresses used for parity data in a RAID storage system. Still further, the specified logical addresses may be specified by the host computer or an application program thereon.

Preferred embodiments provide a relatively low cost method for providing a high performance region in a disk storage system where two heads can access the sectors in the high performance region. To optimize the use of the high performance region, the controller or the host computer may provide a mapping to map logical addresses (LBAs) used for frequently accessed files, e.g., the file system, operating system files, etc., to those sectors in the high performance regions where two heads operate. In this way, throughput is increased for those logical addresses that are most frequently accessed, thereby increasing the likelihood that I/O requests will be serviced from the high performance zone. Further, by not using multiple heads on the other disk surfaces, costs are minimized at the same time that throughput is optimized.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Disk Drive System

Figure 1:
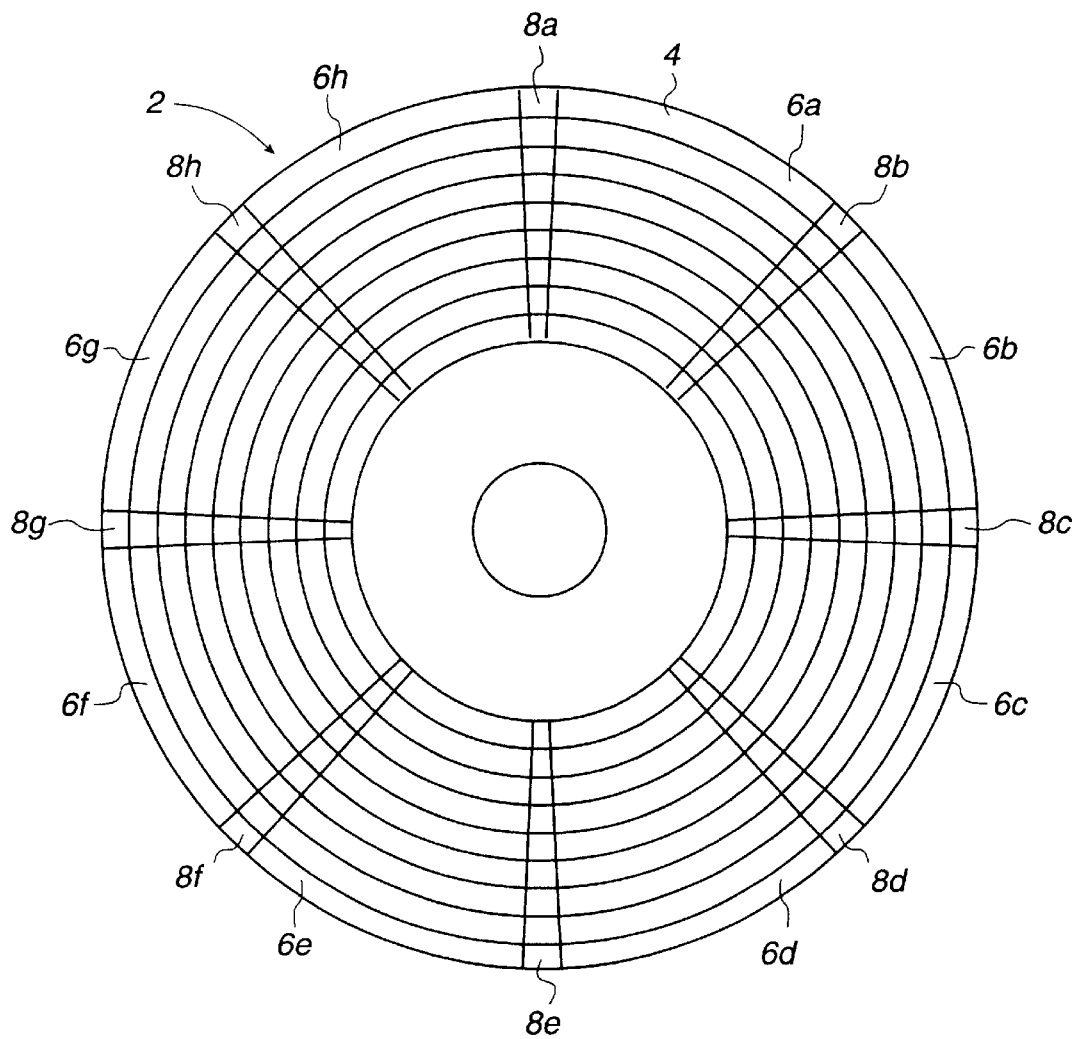
FIG. 1 is a block diagram that illustrates the arrangement of data within a recording disk in accordance with the prior art.
Figure 2:
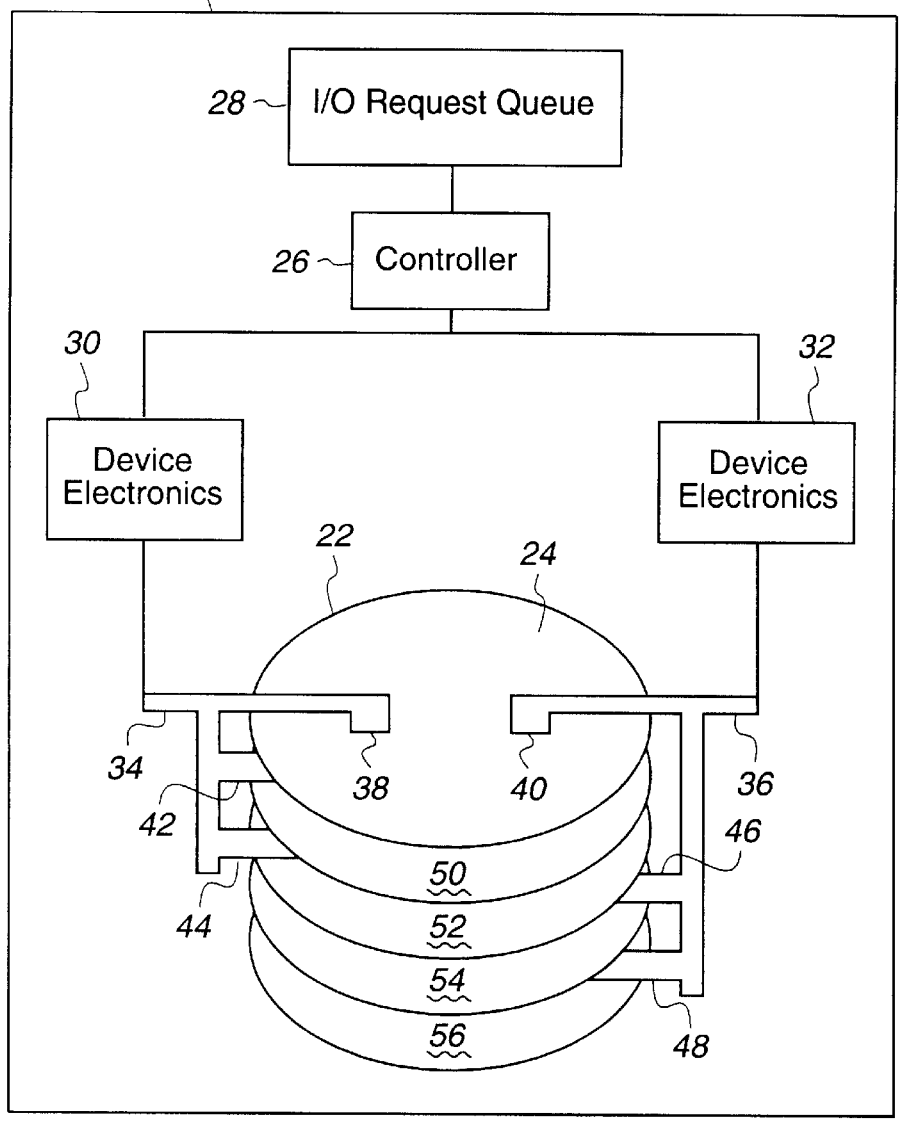
FIG. 2 illustrates a diagram of the hard disk drive components in accordance with preferred embodiments of the present invention.

FIG. 2 illustrates a disk drive system 20 in which preferred embodiments are implemented. The disk drive system 20 comprises a rotating disk 22 having at least one recording storage medium surface 24. A controller 26 processes I/O requests from an I/O request queue 28 that receives I/O read/write requests from one or more systems. The controller 26 maps the LBA subject to the /O request to a physical location on the disk surface 24 at a specific track, sector, and surface. In a mutli-disk system, the controller 26 would determine the specific disk and surface including the sector and track containing the requested target LBA. The controller 26 would submit command signals to the device electronics 30, 32, which comprises servo-electric motors. The device electronics 30, 32 control the movement of actuator arms 34, 36, 42, 44, 46, and 48. Actuator arms 34 and 36 position the respective read/write heads 38, 40 over a specific track and sector. In preferred embodiments, the actuator arms 34, 36 are positioned 180 degrees apart, opposite each other. In this way, the controller 26 can simultaneously control the different actuator arms 34, 36 to move independently to different locations on the disk surface 24. Designing actuator arms positioned opposite each other on the same disk surface is known in the art and described in U.S. Pat. No. 5,341,351, entitled "Method and Means for Optimally Accessing Data Residing on Dual Actuator DASDS," assigned to IBM, which is incorporated herein by reference in its entirety, and implemented in the Conner Chinook disk drive system described above.

In preferred embodiments, the disk system 20 may include additional disks 50, 52, 54, and 56. In preferred embodiments, each of the additional disks 50, 52, 54, and 56 include one actuator and head disk assembly 42, 44, 46, and 48, respectively, per disk surface. In this way, the disk surface 24 comprises the high throughput disk surface as it is the only surface having two heads 38, 40. The device electronics 30 would maintain different electronic paths to allow for independent control of the movement of the additional actuators 42, 44, 46, and 48.

The controller 26 includes algorithms to convert LBAs to physical sector/track locations on the disk surfaces in a manner known in the art. In preferred embodiments, the controller 26 includes additional logic to map specified LBA range(s) to that disk surface 24 having the multiple heads 38 and 40, or the high performance zone area of the disk drive system 20. This region is referred to as the high performance zone because data can be accessed substantially faster in this region having two heads as opposed to those disk surfaces 50, 52, 54, and 56 having only one actuator and head. In preferred embodiments, either head 38, 40 can access any region of the surface 24. In this way, access times in the high performance zone are substantially reduced because the distance to any position is shorter as there are two available heads 24 to access any position. Further, two positions can be accessed concurrently. Allowing both heads to access all positions in the high performance zone ensures that no matter what head is performing an operation, the other head, if available, can handle operations with respect to the high performance zone.

Figure 3:
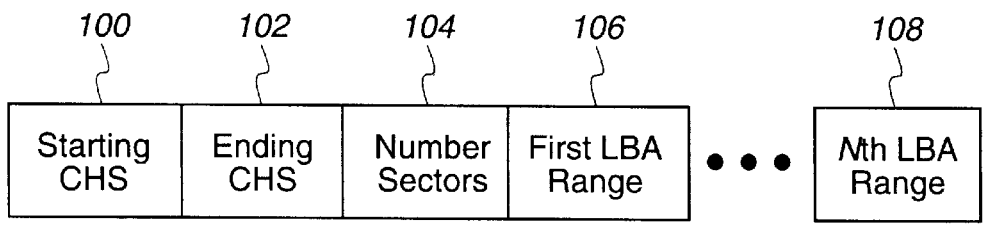
FIG. 3 illustrates fields used to map logical addresses to physical sectors in a disk drive in accordance with preferred embodiments of the present invention.

In preferred embodiments, the first disk surface 24 includes the high performance zone. Thus, LBA mappings to the sectors on disk surface 24 would be specified in the first partition of the disk drive 20. The mappings to other sectors would be specified in the partition tables for those sectors. FIG. 3 illustrates the fields that may be included in each partition table to provide the mapping of the LBA ranges to contiguous sectors for a particular partition. Each partition would indicate a starting 100 and ending 102 CHS defining a range of consecutive sectors, a number of sectors 104 in the partition, and one or more ranges of LBA addresses 106 through 108. Because non-contiguous ranges of frequently accessed data may be assigned to the "high performance zones" on the disk surface 24 with multiple heads, the controller 26 may assign any N non-contiguous ranges of LBA addresses to the consecutive sectors of the partition defined between the starting 100 and ending 102 CHS addresses. If one or more non contiguous ranges of LBA addresses are assigned to the "high performance zone" that would otherwise be mapped to another disk surface, then the partitions for other disk surfaces would also include non-contiguous ranges of LBA addresses to map to the contiguous sectors defined for that partition.

Figure 4:
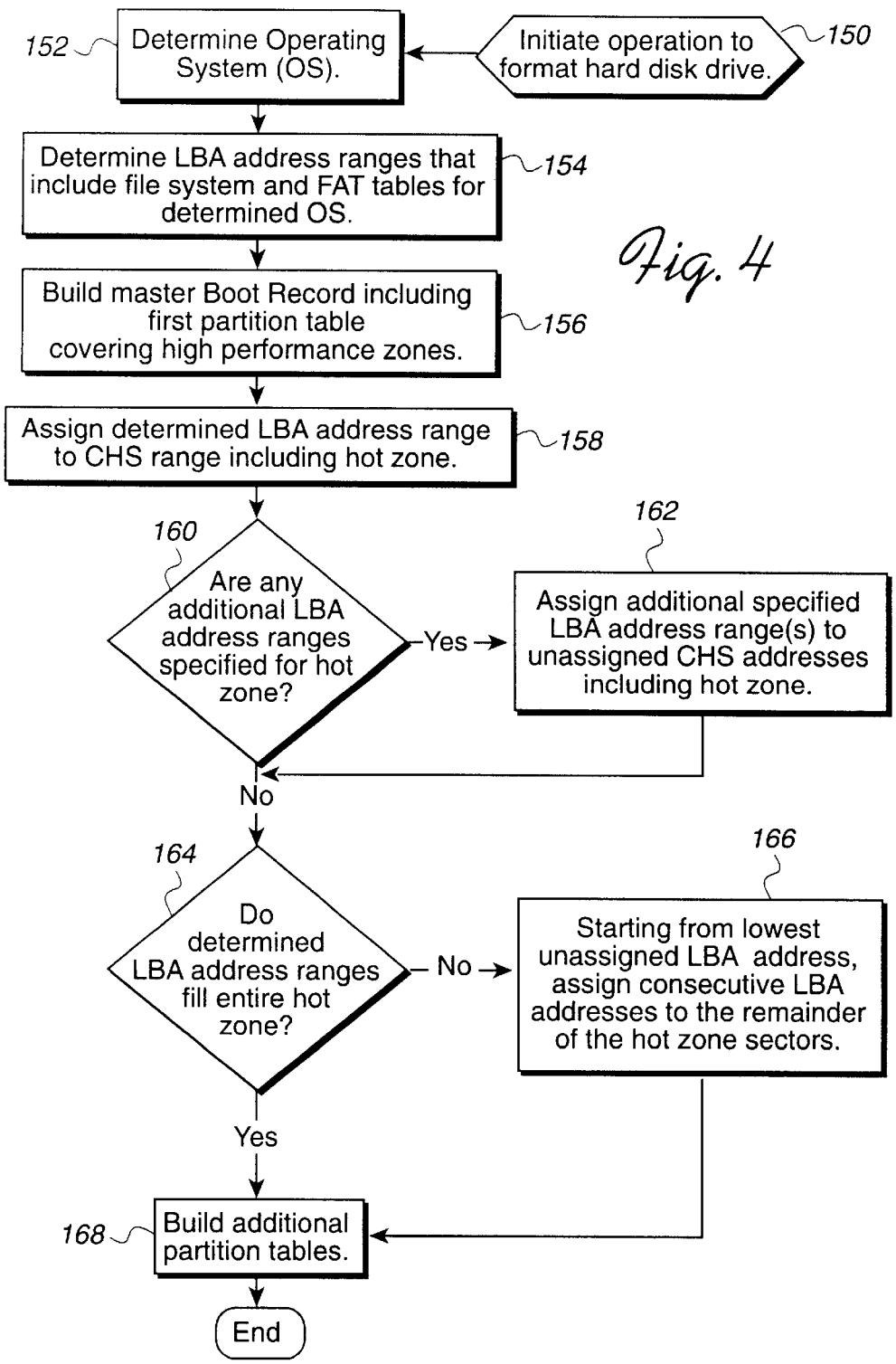
FIG. 4 illustrates logic to format a hard disk drive to map certain logical address ranges to a high throughput surface medium in accordance with preferred embodiments of the present invention.

The determination of which LBA addresses to map to the "high performance zones" would likely be based on the operating system or user defined ranges at a host computer that is the master of the hard disk drive. For instance, it would be desirable to locate LBA addresses frequently accessed by the operating system in the "high performance zones", such as the file allocation table, file system, directory structures, swap files, frequently used operating system files, etc. In this way, those frequently accessed files would be placed at sectors that can be accessed from two different heads 38, 40. FIG. 4 illustrates logic implemented in the controller 26 to assign ranges of LBA addresses to the partitions. Control begins at block 150 with the initiation of an operation to format the hard disk drive 20 from a host computer that will boot-up from the disk drive 20. In preferred embodiments, the controller 26 would somehow learn (at block 152) of the type of operating system (OS) of the host computer. The controller 26 may learn of this information by querying the host computer or the host computer may communicate this information to the controller 26. From the information on the operating system, the controller 26 would determine (at block 154) the LBA address ranges frequently accessed by the operating system, such as the file system, file allocation table, swap files, operating system files, the kernel, etc. The controller 26 may maintain such information for different operating system types. For instance, different operating systems locate their file systems at different LBA address ranges. The Microsoft Windows operating system places the file system in the earlier LBA addresses whereas Unix places the sectors in the middle of the LBA address range. Either way, the controller 26 will map such frequently accessed file system LBA address ranges to the high performance sectors. Alternatively, the operating system may communicate to the controller 26 specific LBA address ranges to place in the high performance zones.

The controller 26 will then build (at block 156) a Master Boot Record including partition tables at the first sectors on the disk drive, i.e., from a CHS of 0/0/1, from information provided by the host operating system. When building the partition tables, the controller 26 would assign (at block 158) the determined LBA address ranges to the CHS range including the high performance zone. It is also possible that the host computer may communicate additional LBA addresses to place in the high performance sectors. For instance, the user may specify LBA address ranges frequently accessed by application programs place frequently to place in the high performance zone sectors. Alternatively, a database or other application program, which sometimes takes over management of hard disk drive functions, may assign LBA address ranges for key indexes and tables in the high performance zone sectors that are frequently accessed for file management purposes, such as the volume table of contents (VTOC) that describes each data set on a volume. If there are such additional LBA ranges specified for the high performance zone sectors (at block 160), then the controller 26 assigns (at block 162) those additional specified LBA address ranges to the high performance zone sectors. If (at block 164) the LBA address ranges specified by the host utilize all the high performance zone sectors, then the controller 26 starts from the lowest unassigned LBA address, and assigns (at block 166) consecutive unassigned LBA addresses to the remainder of the high performance zone sectors. The controller 26 would also build (at block 168) any additional partition tables to the disk surface 24.

After the controller 26 defines the mapping, any I/O requests directed toward frequently accessed LBA address ranges assigned to the high performance sectors will be performed at high performance zone sectors, which may be accessed by either of the heads 38, 40 on the dual head surface 24.

Preferred embodiments provide an additional mapping operation to map host operating system, application program, and user specified LBA address ranges to the surface 24 having two heads 38 and 40, i.e., the high performance zone. This system will substantially increase performance and throughput by placing the frequently accessed operating system and application program LBA addresses in the high throughput region. For example, to perform write operations, the operating system must also update the file system. With the preferred embodiments, a write operation and the accompanying file system access operation may occur simultaneously, each operation performed by one of the heads 38, 40. This further increases throughput by performing two related I/O operations concurrently. Still further, two frequently accessed sectors in the high performance zone may be processed concurrently. This system, thus, increases throughput and processing of I/O requests by processing the more frequently accessed sectors, for which there are a greater number of I/O requests, at a faster rate, thereby improving overall system performance.

The preferred embodiment technique accomplishes increased throughput without incurring the costs associated with other disk drive systems that place multiple heads on each disk surface, such as the Chinook disk drive. With the preferred structure, only one surface, to which the most frequently accessed LBA addresses are assigned, has multiple heads 38, 40. The use of the preferred embodiment with a multi-platter disk drive improves throughput and reduces manufacturing costs over current systems placing multiple heads on every disk surface.

Alternative Embodiments\Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments described the two actuators 34 and 36 on the same disk surface 24 as opposite one another by 180 degrees. Those skilled in the art will recognize alternative ways to position the two actuators 34 and 36. For instance, the two actuators 34 and 36 may be coaxial and pivot from the same point.

Preferred embodiments described both heads 38 and 40 as capable of accessing every sector in the high performance zone, which comprises the disk surface 24. In alternative embodiments, the heads 38 and 40 may not both be able to access all sectors on the high performance zone. Nonetheless, performance is improved because each head 38 and 40 has a smaller range of sectors to access than if there was only one head.

In further embodiments, performance in the high performance zone sectors could be further enhanced by adding additional heads to provide more than two heads accessing the high performance zone sectors.

Preferred embodiments described the logical addressing as LBAs. However, in alternative embodiments the logical addresses used by the host operating system may be in formats other than the LBA block format. In such case, the controller 26 would maintain other mapping conventions to accommodate different logical formats for the disk drive.

In preferred embodiments, the mapping of frequently accessed addresses was described as performed at the controller 26 level. However, in alternative embodiments, the mapping may be performed at the operating system level without the knowledge of the controller 6.

Preferred embodiments described the controller 26 as indicating the mapping of LBAs to sectors in the partition region of the Master Boot Record. However, in alternative embodiments, the controller 26 may place the mappings for the high performance zone sectors in alternative locations of the disk surface 24. In still further embodiments, the LBA mappings may be maintained in a programmable memory chip.

The preferred embodiments may be implemented in a RAID (Redundant Array of Independent Disk) system. In such case, the controller 26 may map frequently used data structures, such as the parity data, to the high performance sectors. This would substantially improve the performance of RAID systems, where parity must be updated for every write operation. Placing the parity data in the high performance zones will significantly increase performance by allowing the parity data to be accessed concurrently while other sectors are being updated.

The logic of the preferred embodiments may be implemented in code that is capable of being transmitted from a server over a network, such as the Internet, to the disk drive electronics to reprogram the memory device storing the code for the processor 40. In this way, the code in the disk drive may be updated over a network.

Preferred embodiments were described with respect to I/O commands queued against a hard disk drive. In alternative embodiments, the storage medium against which I/O commands are queued may be any suitable storage medium known in the art, such as tape cartridges, optical disk drives, holographic storage medium, CD-ROM, and any other non-volatile and volatile storage mediums known in the art.

In summary, preferred embodiments disclose a system, method, and program for mapping logical addresses to physical sectors on a storage device including at least one storage medium surface. A determination is made of logical addresses that are specified to be stored in a high throughput region on one storage medium surface. At least two read/write heads operate on the storage medium surface including the high throughput region to increase performance of access operations in the high throughput region. A mapping is generated of the determined logical addresses to the high throughput region. The logical addresses mapped to the high throughput region are capable of being non-contiguous.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for mapping logical addresses to physical sectors on a storage device including at least one storage medium surface, comprising:

determining logical addresses that are specified to be stored in a high throughput region on one storage medium surface, wherein at least two read/write heads operate on the storage medium surface including the high throughput region to increase performance of access operations in the high throughput region; and generating a mapping of the determined logical addresses to the high throughput region, wherein the logical addresses mapped to the high throughput region are capable of being non-contiguous.

2. The method of claim 1, wherein generating the mapping comprises associating a range of contiguous sectors in the high throughput region with at least two ranges of non-contiguous logical addresses, wherein the ranges of non-contiguous logical addresses map to the contiguous sectors in the high throughput region.

3. The method of claim 1, wherein the multiple read/write heads operating on the storage medium surface including the high throughput region are both capable of accessing every sector in the high throughput region.

4. The method of claim 1, wherein the logical addresses that are specified to be stored in the high throughput region comprise logical addresses used for a file system of a host operating system.

5. The method of claim 1, further comprising:

receiving from a host computer a specification of at least one logical address range to store in the high throughput region, wherein the generated mapping of the logical addresses to the high throughput region includes the at least one logical address range specified by the host computer.

6. The method of claim 1, wherein the logical addresses that are specified to be stored in the high throughput region comprise logical addresses used for parity data in a RAID storage system.

7. A method for mapping logical addresses to physical sectors on a storage device including at least one storage medium surface, comprising:

determining logical addresses that are specified to be stored in a high throughput region on one storage medium surface, wherein at least two read/write heads operate on the storage medium surface including the high throughput region to increase performance of access operations in the high throughput region; and generating a mapping of the determined logical addresses to the high throughput region, wherein the logical addresses mapped to the high throughput region are capable of being non-contiguous, wherein each sector in the high throughput region is assigned to one of the read/write heads accessing the storage medium surface including the high throughput region, and wherein the storage device further includes additional storage medium surfaces where only one read/write head accesses the additional storage medium surfaces.

8. A method for mapping logical addresses to physical sectors on a storage device including at least one storage medium surface, comprising:

determining logical addresses that are specified to be stored in a high throughput region on one storage medium surface by:

(i) determining a type of host operating system; and (ii) determining a logical address range where the determined type of operating system stores a file system, wherein the logical addresses specified to be stored in the high throughput region include the logical address range where the file system of the host operating system is stored, wherein at least two read/write heads operate on the storage medium surface including the high throughput region to increase performance of access operations in the high throughput region; and generating a mapping of the determined logical addresses to the high throughput region, wherein the logical addresses mapped to the high throughput region are capable of being non-contiguous.

9. A storage system, comprising:

at least one storage medium surface;

a first actuator arm having a first head positioned to access sectors on the storage medium surface;

a second actuator arm having a second head positioned to access sectors on the storage medium surface;

a controller controlling the movement of the first and second actuator arms and placement with respect to the storage medium surface, including:
   (i) logic for determining at least two ranges of noncontiguous logical addresses to map to the storage medium surface; and
   (ii) logic for generating a mapping of the determined logical addresses to the storage medium surface.

10. The storage system of claim 9, wherein generating the mapping comprises associating a range of contiguous sectors on the storage medium surface with at least two ranges of non-contiguous logical addresses, wherein the ranges of non-contiguous logical addresses map to the contiguous sectors on the storage medium surface.

11. The storage system of claim 9, wherein the determined at lest one range of logical addresses are mapped to high throughput sectors of the storage medium surface that are accessible to both the first and second heads.

12. The storage system of claim 9, wherein the storage system is in communication with a host computer system, wherein the logical addresses that are specified to be stored on the storage medium surface comprise logical addresses used for the file system of a host operating system.

13. The storage system of claim 9, further comprising:

means, performed by the controller, for receiving from the host computer a specification of a logical address range to store on the storage medium surface, wherein the generated mapping of the logical addresses to the storage medium surface includes the logical address range specified by the host computer.

14. The storage system of claim 9, wherein the logical addresses that are specified to be stored in the storage medium surface comprise logical addresses used for parity data in a RAID storage system.

15. The storage system of claim 9, wherein the storage medium is implemented in a storage system that is a member of the set of storage systems comprising hard disk drives.

16. A storage system, comprising:

at least one storage medium surface, wherein the storage medium surface comprises one side of a storage disk;

at least one additional storage disk having at least one storage medium surface; and a first actuator arm having a first head positioned to access sectors on the storage medium surface;

a second actuator arm having a second head positioned to access sectors on the storage medium surface;

one actuator arm having a head positioned with respect to each additional storage medium surface to access sectors in the storage medium surface, wherein there is only one actuator arm on at least one of the additional storage medium surfaces;

a controller controlling the movement of the first and second actuator arms and placement with respect to the storage medium surface, including:
   (i) logic for determining at least two ranges of noncontiguous logical addresses to map to the storage medium surface; and
   (ii) logic for generating a mapping of the determined logical addresses to the storage medium surface.

17. A storage system, comprising:

at least one storage medium surface;

a first actuator arm having a first head positioned to access sectors on the storage medium surface;

a second actuator arm having a second head positioned to access sectors on the storage medium surface;

a controller controlling the movement of the first and second actuator arms and placement with respect to the storage medium surface, including:
   (i) logic for determining at least two ranges of noncontiguous logical addresses that are specified to be stored on the storage medium surface by determining a type of the operating system and determining the logical address range where the determined type of operating system stores the file system, wherein the logical addresses specified to be stored on the storage medium surface include the logical address range where the file system is stored; and
   (ii) logic for generating a mapping of the determined logical addresses to the storage medium surface, wherein the determined at least one range of logical addresses are mapped to high throughput sectors of the storage medium surface that are accessible to both the first and second heads.

18. An article of manufacture for mapping logical addresses to physical sectors on a storage device including at least one storage medium surface, the article of manufacture comprising computer usable storage media including at least one computer program embedded therein that causes a controller to perform:

determining logical addresses that are specified to be stored in a high throughput region on one storage medium surface, wherein at least two read/write heads operate on the storage medium surface including the high throughput region to increase performance of access operations in the high throughput region; and generating a mapping of the determined logical addresses to the high throughput region, wherein the logical addresses mapped to the high throughput region are capable of being non-contiguous.

19. The article of manufacture of claim 18, wherein generating the mapping comprises associating a range of contiguous sectors in the high throughput region with at least two ranges of non-contiguous logical addresses, wherein the ranges of non-contiguous logical addresses map to the contiguous sectors in the high throughput region.

20. The article of manufacture of claim 18, wherein the multiple read/write heads operating on the storage medium surface including the high throughput region are both capable of accessing every sector in the high throughput region.

21. The article of manufacture of claim 18, wherein the logical addresses that are specified to be stored in the high throughput region comprise logical addresses used for a file system of a host operating system.

22. The article of manufacture of claim 18, further comprising:

receiving from a host computer a specification of at least one logical address range to store in the high throughput region, wherein the generated mapping of the logical addresses to the high throughput region includes the at least one logical address range specified by the host computer.

23. The article of manufacture of claim 18, wherein the logical addresses that are specified to be stored in the high throughput region comprise logical addresses used for parity data in a RAID storage system.

24. An article of manufacture for mapping logical addresses to physical sectors on a storage device including at least one storage medium surface, the article of manufacture comprising computer usable storage media including at least one computer program embedded therein that causes a controller to perform:

determining logical addresses that are specified to be stored in a high throughput region on one storage medium surface, wherein at least two read/write heads operate on the storage medium surface including the high throughput region to increase performance of access operations in the high throughput region, wherein each sector in the high throughput region is assigned to one of the read/write heads accessing the storage medium surface including the high throughput region, and wherein the storage device further includes other storage medium surfaces where only one read/write head accesses the storage medium surface; and generating a mapping of the determined logical addresses to the high throughput region, wherein the logical addresses mapped to the high throughput region are capable of being non-contiguous.

25. An article of manufacture for mapping logical addresses to physical sectors on a storage device including at least one storage medium surface, the article of manufacture comprising computer usable storage media including at least one computer program embedded therein that causes a controller to perform:

determining logical addresses that are specified to be stored in a high throughput region on one storage medium surface by:

(i) determining a type of the operating system;

(ii) determining the logical address range where the determined type of operating system stores the file system, wherein the logical addresses specified to be stored in the high throughput region include the logical address range where the file system is stored, wherein at least two read/write heads operate on the storage medium surface including the high throughput region to increase performance of access operations in the high throughput region, and wherein the logical addresses that are specified to be stored in the high throughput region comprise logical addresses used for a file system of a host operating system; and generating a mapping of the determined logical addresses to the high throughput region, wherein the logical addresses mapped to the high throughput region are capable of being non-contiguous.

* * * * *

UNITED STATES PATENT AND TRADEMARK OFFICE
CERTIFICATE OF CORRECTION

PATENT NO. : 6,502,178 B1 Page 1 of 1
DATED : December 31, 2002
INVENTOR(S) : Aaron Keith Olbrich It is certified that error appears in the above-identified patent and that said Letters Patent is hereby corrected as shown below:

<u>Column 9,</u>
Line 25, delete "lest" and insert -- least --.

Signed and Sealed this

Tenth Day of May, 2005

JON W. DUDAS
*Director of the United States Patent and Trademark Office*